3,005,908
LAMPS USED FOR FISHING AND UNDERWATER WORK
Luigi Fausto Farina, Via Giovanni, Cena 23, Fiumicino, Rome, Italy
Filed Feb. 13, 1959, Ser. No. 793,120
Claims priority, application Italy Feb. 18, 1958
1 Claim. (Cl. 240—26)

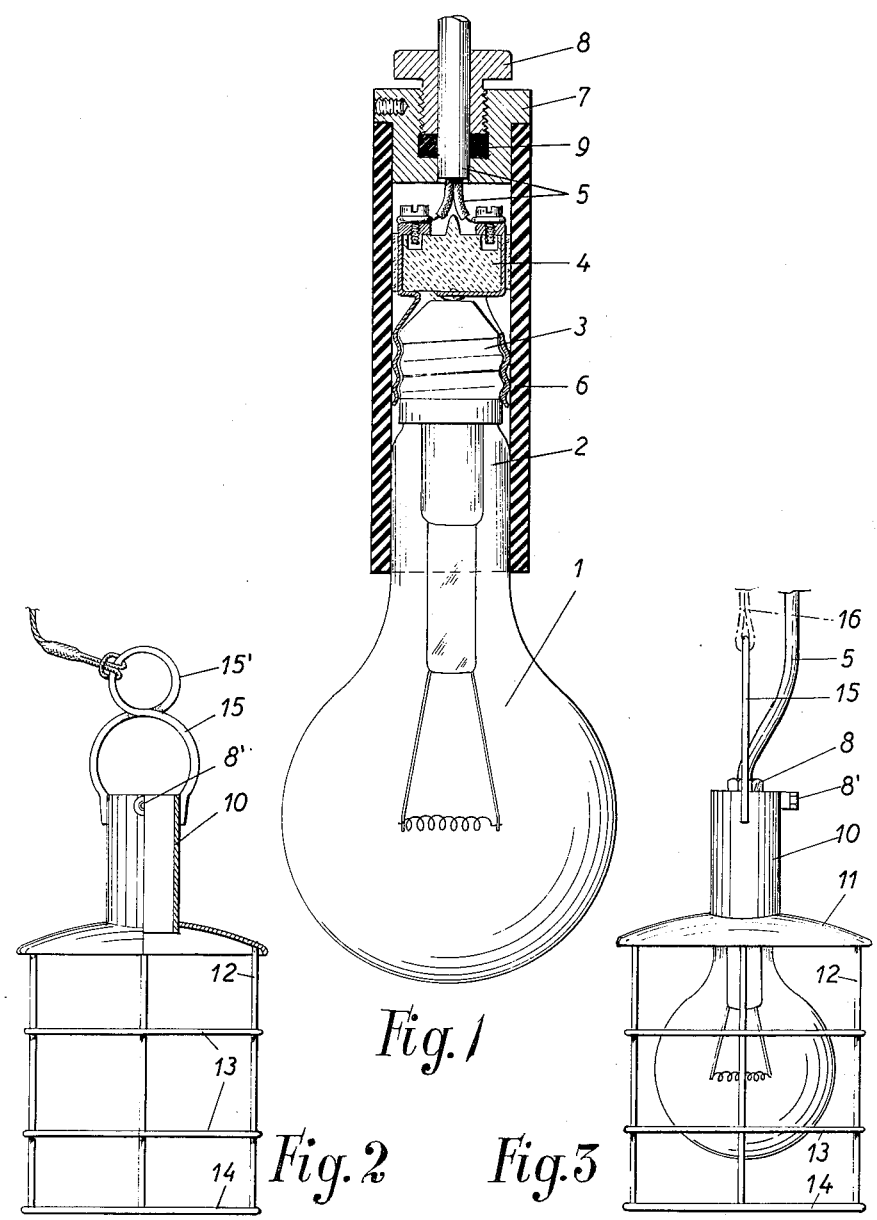

Light fishing with submerged lamps is now widely practiced on all sea coasts, particularly in warm seas where the transparency of the waters allows the light to penetrate to great depths. In the conventional lamps used for this kind of fishing the incandescent bulb is protected by a glass globe of considerable thickness, which must form a watertight enclosure around the said bulb. If the globe is not perfectly watertight, some water seeps in and, coming into contact with the bulb which reaches considerably high temperatures, causes the said bulb to explode, resulting in a considerable loss because the bulbs used are of the low-voltage high-power type (1500 to 2500 and more candlepower).

The object of the present invention is to dispense with the external glass globe and to insulate all submerged electrified parts. With this arrangement, various advantages are obtained: the bulb is effectively cooled by direct contact with water, and its life is prolonged even if it is subjected to more than its rated voltage, thus producing a whiter and stronger light. The efficiency of the lamp is further increased by the elimination of the loss caused in conventional lamps by the presence of the globe. Weight and bulk are decreased, while providing a strong and safe protection cage, which can easily be ballasted to ensure stability and prevent the overturning of the lamp which results in blinding the fishermen.

Further advantages of the invention will be evident from the description of a preferred embodiment, which is set forth below, as a non limiting example, with reference to the enclosed drawings, in which:

FIG. 1 is a cross-sectional view of the incandescent bulb and of the devices for the insulation of the electric cables and electrified parts;

FIG. 2 represents the lamp cage;

FIG. 3 is a cross-sectional view of the assembly comprising the bulb, cage and auxiliary components.

With reference to the figures, the incandescent bulb consists of a spherical glass vessel 1, a neck 2 and a base 3, which is screwed into a socket 4, to which are connected the power supply cables 5, according to the known arrangement. Over the bulb neck is fitted a tube 6, made of rubber, plastic or similar material, which extends a certain length above the socket 4, closed at the top by a bushing 7, internally threaded to receive a sealing nut 8 through which passes power cable 5, a watertight seal being provided by a gasket 9.

The tube 6, of rubber or similar material, is force-fitted over bushing 7 and bulb neck 2, forming over these parts a watertight seal, also by using an appropriate sealing cement.

The rubber tube with the said parts is fitted into a metal pipe 10 fastened to a substantially flat reflector plate 11, on the edge of which are soldered or welded several metal rods 12 perpendicular to the plane of the said reflector plate, such rods being interconnected by one or more metal rings 13, one of which 14, of greater weight and strength, is fastened to the lowermost ends of the rods 12, acting as ballast to keep the lamp in a vertical position.

At the upper end of tube 10 is welded a heavy metal wire forming a handle 15, the upper end of which is shaped to form a ring 15' to which is secured the end of a rope 16 fastened to the boat, so that power cable 5 is never subject to any strain. A grub 8' locks the sealing nut 8 on pipe 10.

Since the invention has been described above for purposes of exemplification, any change and variations falling within the spirit and scope thereof shall be understood to be covered by the following claim.

What is claimed is:

A lamp, for use underwater during fishing operations and the like, comprising a cylindrical cage adapted to extend substantially vertically in operation, said cage having bars disposed vertically around its circumferential periphery and horizontally disposed rings interconnecting said bars at spaced intervals, the lowermost of said spaced horizontal rings being of greater thickness and weight than the other rings; a plate firmly connected to the tops of said bars; a cylindrical metal pipe firmly connected with said plate and extending vertically upwardly from the center thereof, a resilient tube within said pipe, a socket within said resilient tube, a bushing engaging said resilient tube and located above said socket, a sealing nut carried by said bushing, an incandescent bulb connected to said socket, said resilient tube tightly enclosing said socket and extending to fit over the neck of the incandescent bulb at one end and to be enclosed by said bushing and said sealing nut at the other end, current-carrying cables operatively connected to said socket and extending through said bushing, said gasket and said sealing nut, and a gasket located within said bushing and engaging said sealing nut and said cables to provide a watertight seal.

References Cited in the file of this patent
UNITED STATES PATENTS

| | | |
|---|---|---|
| 1,611,651 | Leavitt | Dec. 21, 1926 |
| 2,508,063 | Gross | May 16, 1950 |
| 2,594,753 | Falge | Apr. 29, 1952 |
| 2,609,611 | Dickson | Sept. 9, 1952 |
| 2,749,527 | Gast | June 16, 1956 |
| 2,813,922 | Arnold | Nov. 19, 1957 |